United States Patent [19]
Frey et al.

[11] Patent Number: 5,840,807
[45] Date of Patent: Nov. 24, 1998

[54] PACKAGING BASED ON A POLYMER CONTAINING POLYAMIDE BLOCKS AND POLYETHER BLOCKS, FOR CONSERVING FRESH PRODUCE

[75] Inventors: Alain Frey, St-Leger de Rôtes; Roland Leroux, Chaville; Laurent Fischer, Sequigny, all of France

[73] Assignee: Elf Atochem S.A., Puteaux, France; .

[21] Appl. No.: 766,253

[22] Filed: Dec. 13, 1996

Related U.S. Application Data

[62] Division of Ser. No. 634,753, Apr. 10, 1996.

[30] Foreign Application Priority Data

Apr. 11, 1995 [FR] France .................................. 95 04324

[51] Int. Cl.$^6$ ..................................... C08G 63/00

[52] U.S. Cl. .......................................... 525/178; 505/184

[58] Field of Search ..................................... 525/178, 184

[56] References Cited

U.S. PATENT DOCUMENTS

| | | | |
|---|---|---|---|
| 3,946,089 | 3/1976 | Furukawa et al. | 525/408 |
| 4,847,142 | 7/1989 | Twilley | 428/252 |
| 4,937,139 | 6/1990 | Genske et al. | 428/349 |
| 5,166,309 | 11/1992 | Maj et al. | 528/272 |
| 5,254,354 | 10/1993 | Stewart | 426/106 |
| 5,348,807 | 9/1994 | Vasselin | 428/423.1 |
| 5,369,179 | 11/1994 | Havens | 525/183 |

FOREIGN PATENT DOCUMENTS

| | | |
|---|---|---|
| 559284 | 9/1993 | European Pat. Off. . |
| 2112789 | 7/1983 | United Kingdom . |

*Primary Examiner*—Melvin I. Marquis
*Attorney, Agent, or Firm*—Pennie & Edmonds LLP

[57] ABSTRACT

The invention relates to a packaging comprising a thermoplastic film based on a polymer containing polyamide blocks and polyether blocks, said polymer being permeable to water vapor, to ethylene, to $CO_2$ and to oxygen, such that the permeability to $CO_2$ is very much greater than the permeability to oxygen. The invention is particularly useful for making sachets in order to conserve fresh fruit, vegetables or meat.

11 Claims, No Drawings

PACKAGING BASED ON A POLYMER CONTAINING POLYAMIDE BLOCKS AND POLYETHER BLOCKS, FOR CONSERVING FRESH PRODUCE

This is a division of application Ser. No. 08/634,753, filed Apr. 10, 1996.

DESCRIPTION

The invention relates to a packaging based on a polymer containing polyamide blocks and polyether blocks, in order to conserve fresh produce such as fruit and vegetables or freshly cut meat.

The invention is particularly useful for conserving the taste of fruit or vegetables which have just been harvested, and also for preventing their degradation.

Canadian patent application CA 1,324,476 has described lettuce sachets consisting of a perforated first film and a second film adhesively bonded to the first.

The perforated film may be made of polyethylene, polypropylene, drawn polyester or drawn polyamide. The second film is itself a multilayer successively comprising a film of ethylene/vinyl acetate (EVA) copolymer, a central oxygen-permeable film and a film which may be heat-sealed.

Japanese patent application JP 05 230 235 (KOKAI) has described perforated films consisting of a mixture of low-density polyethylene, Nylon-6 and maleic-treated polyethylene. These perforated films have good permeability to oxygen and to water vapour. They are used to make sachets for conserving freshly picked mushrooms.

Japanese patent application JP 03 180 124 described sachets made of film which is permeable to water vapour and to air and to ethylene, in order to ripen peaches on the tree.

The film consists of a mixture of polyolefins and fillers such as calcium carbonate or silica, and the film is then drawn in order to create spaces between the polyolefin and the fillers.

The object of the present invention is a thermoplastic film which is permeable (i) to water vapour, to ethylene, to $CO_2$ and to oxygen and such that (ii) the permeability to $CO_2$ is very much greater than that to oxygen. These films are transformed into sachets by the usual means such as, for example, hot bonding or welding. The fruit or vegetables which have just been harvested are placed in the sachets and the sachet is then sealed. This film may also be used in order to cover pots or trays containing fresh produce.

The object of the invention is also an unperforated continuous film. In contrast with perforated films, the film of the invention is thus bacteria-proof and germ-proof.

The Applicant has discovered that films based on a polymer containing polyamide blocks and polyether blocks possess these properties. The present invention is thus a packaging comprising a thermoplastic film based on a polymer containing polyamide blocks and polyether blocks, which is permeable (i) to water vapour, to ethylene, to $CO_2$ and to oxygen and such that (ii) the permeability to $CO_2$ is very much greater than that to oxygen.

Polymers containing polyamide blocks and polyether blocks result from the copolycondensation of polyamide units containing reactive ends with polyether units containing reactive ends, such as, inter alia:

1) Polyamide units containing diamine chain terminations with polyoxyalkylene units containing dicarboxylic chain terminations.

2) Polyamide units containing dicarboxylic chain terminations with polyoxyalkylene units containing diamine chain terminations obtained by cyanoethylation and hydrogenation of aliphatic alpha-omega dihydroxylated polyoxyalkylene units referred to as polyether diols.

3) Polyamide units containing dicarboxylic chain terminations with polyether diols, the products obtained in this particular case being polyether ester amides.

The polyamide units containing dicarboxylic chain terminations originate, for example, from the condensation of alpha-omega aminocarboxylic acids of lactams or of dicarboxylic acids and diamines in the presence of a chain-limiting dicarboxylic acid. The polyamide blocks are advantageously Nylon-12.

The number-average molar mass $\overline{M}n$ of the polyamide units is between 300 and 15,000 and preferably between 600 and 5000. The mass $\overline{M}n$ of the polyether units is between 100 and 6000 and preferably between 200 and 3000.

The polymers containing polyamide blocks and polyether blocks may also comprise randomly distributed moieties. These polymers may be prepared by the simultaneous reaction of the polyether and the precursors of the polyamide blocks.

For example, it is possible to react polyether diol, a lactam (or an alpha-omega amino acid) and a chain-limiting diacid in the presence of a small amount of water. A polymer is obtained which essentially has polyether blocks, polyamide blocks of very variable length,-but also the various reactants which have reacted randomly and which are randomly distributed along the polymer chain.

Whether they originate from the copolycondensation of polyamide units and polyethers prepared beforehand or from a one-step reaction, these polymers containing polyamide blocks and polyether blocks have, for example, Shore hardnesses D which may be between 20 and 75 and advantageously between 30 and 70 and an intrinsic viscosity between 0.8 and 2.5 measured in meta-cresol at 250° C. for an initial concentration of 0.8 g/100 ml.

Whether the polyether blocks are derived from polyethylene glycol, from polyoxypropylene glycol or from polyoxytetramethylene glycol, they are either used as they are and copolycondensed with polyamide blocks containing carboxylic ends, or they are aminated in order to be converted into polyether diamines and condensed with polyamide blocks containing carboxylic ends. They may also be mixed with polyamide precursors and a chain limiter in order to make polymers containing polyamide blocks and polyether blocks which have randomly distributed moieties.

Polymers containing polyether and polyamide blocks are described in U.S. Pat. Nos. 4,331,786, 4,115,475, 4,195,015, 4,839,441, 4,864,014, 4,230,838 and 4,332,920.

The polyether may be, for example, a polyethylene glycol (PEG), a polypropylene glycol (PPG) or a polytetramethylene glycol (PTMG). This last polyether is also referred to as polytetrahydrofuran (PTHF).

Whether the polyether blocks are in the chain of the polymer containing polyamide blocks and polyether blocks in the form of diols or diamines, they are referred to for simplicity as PEG blocks or PPG blocks or alternatively PTMG blocks.

It would not be departing from the scope of the invention if the polyether blocks contained different moieties such as moieties derived from ethylene glycol ($—OC_2H_4—$), from propylene glycol

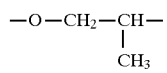

or alternatively from tetramethylene glycol (—O—(CH$_2$)$_4$—).

The polymer containing polyamide blocks and polyether blocks preferably comprises only one type of polyamide block and only one type of polyether block. Polymers containing PA-12 blocks and PEG blocks and polymers containing PA-12 blocks and PTMG blocks are advantageously used.

The polymers containing PEG blocks have a much higher permeability to water vapour than do the polymers containing PTMG blocks.

It is also possible to use a mixture of these two polymers containing polyamide blocks and polyether blocks.

The polymer containing polyamide blocks and polyether blocks is advantageously such that the polyamide is the major constituent by weight, that is to say that the amount of polyamide which is in the form of blocks and that which is optionally distributed randomly in the chain represents 40% by weight or more of the polymer containing polyamide blocks and polyether blocks. Advantageously, the amount of polyamide and the amount of polyether are in the ratio (polyamide/polyether) 1/1 to 3/1 and preferably:

The films of the invention are, for example, between 10 and 150 μm in thickness.

The film of the invention may also comprise plasticizers, antioxidants or anti-UV agents.

According to an advantageous form, the film of the invention also comprises polyolefins. The term polyolefins is understood to refer to polymers comprising olefin moieties such as, for example, ethylene, propylene, 1-butene, etc. moieties.

Examples which may be mentioned are:

polyethylene, polypropylene and copolymers of ethylene with alpha-olefins, it being possible for these products to be grafted with unsaturated carboxylic acid anhydrides such as maleic anhydride or unsaturated epoxides such as glycidyl methacrylate.

copolymers of ethylene with at least one product chosen from (i) unsaturated carboxylic acids, salts thereof and esters thereof, (ii) vinyl esters of saturated carboxylic acids, (iii) unsaturated dicarboxylic acids, salts thereof, esters thereof, hemiesters thereof and anhydrides thereof, and (iv) unsaturated epoxides, it being possible for these ethylene copolymers to be grafted with unsaturated dicarboxylic acid anhydrides or unsaturated epoxides.

optionally maleic-treated styrene/ethylene-butene/styrene (SEBS) block copolymers.

Mixtures of two or more of these polyolefins may be used.
The following are advantageously used:
polyethylene
copolymers of ethylene and an alpha-olefin,
copolymers of ethylene/an alkyl (meth)acrylate,
copolymers of ethylene/an alkyl (meth)acrylate/maleic anhydride, the maleic anhydride being grafted or copolymerized,
copolymers of ethylene/an alkyl (meth)acrylate/glycidyl methacrylate, the glycidyl methacrylate being grafted or copolymerized.

If the polyolefins have few or no functions which may facilitate the compatibilization, it is recommended to add a compatibilizing agent.

The compatibilizing agent is a product which is known per se for compatibilizing polyamides and polyolefins.

Examples which may be mentioned are:
polyethylene, polypropylene, ethylene/propylene copolymers and ethylene/butene copolymers, all of these products being grafted with maleic anhydride or with glycidyl methacrylate.

ethylene/alkyl (meth)acrylate/maleic anhydride copolymers, the maleic anhydride being grafted or copolymerized, ethylene/vinyl acetate/maleic anhydride copolymers, the maleic anhydride being grafted or copolymerized, the previous two copolymers in which the maleic anhydride is replaced by glycidyl methacrylate, ethylene/(meth)acrylic acid copolymers optionally including the salts thereof, polyethylene, polypropylene or ethylene/propylene copolymers, these polymers being grafted with a product having a site which is reactive with amines; these grafted copolymers then being condensed with polyamides or with polyamide oligomers having only one amine end.

These products are described in patents FR 2,291,225 and EP 342,066, the content of which is incorporated in the present application.

The amount of compatibilizing agent is the amount sufficient for the polyolefin to be dispersed, for example, in the form of nodules in the polymer containing polyamide blocks and polyether blocks. It may represent up to 20% of the weight of the polyolefin. These mixtures of polymer containing polyamide blocks and polyether blocks, polyolefin and optionally compatibilizing agents are manufactured according to the usual techniques of mixing in the molten state (twin-screw, Buss, single-screw).

The thermoplastic film of the invention advantageously comprises:

a) a polymer containing polyamide blocks and PEG polyether blocks, the polyamide preferably being PA-12;

b) a copolymer of ethylene and an alkyl (meth)acrylate;

c) an ethylene/alkyl (meth)acrylate/maleic anhydride copolymer.

The preferred proportions are:
60 to 80 parts of a)
20 to 30 parts of b)
and 0 to 10 parts of c).

According to another advantageous form of the invention, the thermoplastic film comprises:

a) a polymer containing polyamide blocks and PEG blocks, the polyamide preferably being PA-12;

b) a polyethylene or a copolymer of ethylene and an alpha-olefin;

c) a copolymer of ethylene and vinyl acetate (EVA) which are grafted.

The preferred proportions are 25 to 35 parts of (a) per 65 to 75 parts of (b) plus (c).

These films comprising EVA are also novel products in themselves, whether they are used to make packaging or for any other application.

The ratio of the permeability, by volume, of the $CO_2$ to the $O_2$ is greater than 8 and preferably between 10 and 15; these values are valid at 0% relative humidity (0% RH) and 23° C.

The permeability to $CO_2$ in ml/m$^2$ 24 h atm is between 15,000 and 80,000 at 0% RH and 23° C. for a 25 μm film.

The permeability to oxygen in ml/m$^2$ 24 h atm is between 1200 and 8000 at 0% RH and 23° C. for a 25 μm film.

The permeability to nitrogen in ml/m$^2$ 24 h atm is between 300 and 3500 at 0% RH and 23° C. for a 25 μm film.

The permeability to water vapour in g/m$^2$/24 h, measured according to ASTM standard E 96 BW at 38° C. and 50% RH, is between 2000 and 25,000 and preferably between 15,000 and 20,000.

The permeability to water vapour and to the other gases increases with the amount of PEG blocks or of (—O—(CH$_2$)$_4$—) moieties in the polyether block of the polymer containing polyamide blocks and polyether blocks.

The hermetic sachets manufactured with the film of the invention, or the films,.make it possible to keep fruit or vegetables which are inside in an atmosphere containing, by volume, 3 to 5% O$_2$, 3 to 5% CO$_2$, traces of ethylene and an amount of water vapour such that there is no fog on the inner surface of the bag on account of the high permeability to water vapour.

This is another advantage of the invention, the reason for this being that the fog is often associated with the development of bacteria. Another advantage of the film of the invention is its transparency. The anti-fogging property is very considerable for moist fresh produce such as meat.

According to another form of the invention, the thermoplastic film based on a polymer containing polyamide blocks and polyether blocks may be coextruded or laminated on a support such as a grille made of polyethylene or of PVC. This makes it possible to have mechanical strength without modifying the permeabilities.

According to another form of the invention, the film of the invention is only part of a packaging, the other part being made of a material which does not have the properties of the film of the invention. For example, a window is made in a film of the invention, in a packaging made of PVC, polyethylene, cardboard, paper, etc.

It would not be departing from the scope of the invention if these films were used to make sachets in which the fruit is wrapped before the harvest and even throughout the period of development and ripening. The fruit is protected from parasites, from contact with herbicides or bactericides which may possibly be spread onto the leaves of trees, from birds, from hailstones and from inclement weather.

EXAMPLE

Product 1 is a polymer containing Nylon-12 blocks (PA-12) of mass $\overline{M}n=1500$ and polyethylene glycol blocks of mass $\overline{M}n=1500$.

The PA-12/PEG mass ratio is 50/50. The intrinsic viscosity, measured at 20° C. in meta-cresol, is 1.45 to 1.60.

Product 2 is as above except for the mass $\overline{M}n$ of the PA-12 blocks, which is 4500. The PA-12/PEG mass ratio is 75/25.

The intrinsic viscosity, measured at 20° C. in meta-cresol, is 1.40 to 1.55.

Product 3 is a mixture of:

65 parts of product 1

25 parts of an ethylene/methyl acrylate copolymer containing 24% by weight of acrylate and MFi 0.5.

10 parts of an ethylene/acrylic ester/maleic anhydride copolymer containing 19% by weight of acrylate and 3% by weight of maleic.

Product 4 is a polymer containing PA-12 blocks of mass $\overline{M}n=1000$ and PTMG blocks of mass $\overline{M}n=1000$.

Product 5 is a polymer containing PA-12 blocks of mass $\overline{M}n=2000$ and PTMG blocks of mass $\overline{M}n=2000$.

The above mixtures are prepared in Buss or Werner machines and films are extruded.

The measurement conditions are as follows:

| Machine: | LYSSY GPM 200 |
|---|---|
| Test surface | 50 cm$^2$ |
| Detection | gas chromatography, thermal conductivity (W2X) |
| Temperature | 23° C. |
| Relative humidity | 0% |
| Carrier gas | helium (pressure: 1 bar) |
| Diffusant gases | O$_2$ + N$_2$ + CO$_2$ (⅓, ⅓, ⅓) (total pressure: 1bar) |

The permeability to water vapour is measured according to the method described in ASTM standard E 96 method BW (film in contact with water) in a Heraeus Votsch oven under conditions of temperature=38° C. and of ambient relative humidity =50% which are maintained throughout the period of measurement.

The result of the permeability to water vapour is given in g/m$^2$/24 h. The inaccuracies in the measurement give a result of plus or minus 10 to 15%. The results are collated in Table 1.

The contents of patents FR 2,291,225 (U.S. Pat. Nos. 3,972,961; 3,976,720; 4,225,476) and EP 342,066 (U.S. Pat. No. 5,342,886) are incorporated by reference.

TABLE 1

| Product | Thickness of the film (μm) | CO$_2$ ml/m$^2$ 24 h atm | O$_2$ ml/m$^2$ 24 h atm | N$_2$ ml/m$^2$ 24 h atm | Water vapour g/m$^2$ 24 h |
|---|---|---|---|---|---|
| Product 1 | 25 | >73000 | 5600 | 2100 | 23000 |
| Product 1 | 50 | >34000 | 2300 | 820 | 23000 |
| Product 3 | 25 | >75000 | 7900 | 3000 | 11000 |
| Product 2 | 25 | >35000 | 2700 | 930 | 12000 |
| Product 2 | 50 | >19000 | 1500 | 500 | 12000 |
| Product 4 | 25 | >81000 | 10000 | 3900 | 1000 to 2000 |
| Product 4 | 35 | >42000 | 6000 | 2200 | 1000 to 2000 |
| Product 5 | 25 | >54000 | 10000 | 4000 | 1000 to 2000 |

We claim:

1. Packaging for fresh food or fruits during development or after ripening comprising a thermoplastic film comprising a block copolymer comprising polyamide blocks and polyether blocks, wherein said thermoplastic film is permeable to water vapour, to ethylene, to CO$_2$, and to oxygen, wherein the permeability to CO$_2$ is greater than the permeability to oxygen, and wherein the thermoplastic film comprises polyolefins.

2. Packaging according to claim 1, wherein the thermoplastic film comprises
a polymer containing polyamide blocks and PEG blocks;
a copolymer of ethylene and an alkyl (meth)acrylate; and
an ethylene/alkyl (meth)acrylate/maleic anhydride copolymer.

3. Packaging according to claim 1, wherein the thermoplastic film comprises a polymer containing polyamide blocks and PEG blocks;
a polymer selected from the group consisting of a polyethylene and a copolymer of ethylene and an alpha-olefin; and
a copolymer of ethylene and vinyl acetate (EVA).

4. A film comprising
a polymer containing polyamide blocks and PEG blocks;
a polymer selected from the group consisting of a polyethylene and a copolymer of ethylene with an alpha-olefin; and
a copolymer of ethylene and vinyl acetate, wherein the film is permeable to water vapour, to $CO_2$, to ethylene and to oxygen such that permeability to $CO_2$ is greater than to oxygen.

5. Packaging for fresh food or fruits comprising a thermoplastic film comprising a block copolymer comprising polyamide blocks and polyether blocks, wherein said thermoplastic film is permeable to water vapour, to ethylene, to $CO_2$, and to oxygen, wherein the permeability to $CO_2$ at least 5.4 times the permeability to oxygen, and wherein the thermoplastic film comprises polyolefins.

6. Packaging according to claim 5, wherein the thermoplastic film comprises
a polymer containing polyamide blocks and PEG blocks;
a copolymer of ethylene and an alkyl (meth)acrylate; and
an ethylene/alkyl (meth)acrylate/maleic anhydride copolymer.

7. Packaging according to claim 5, wherein the thermoplastic film has a permeability to water vapour of greater than 2000 g/m$^2$/24 h through a 25 μm thick film sample.

8. Packaging to conserve fresh produce comprising a thermoplastic film comprising a block copolymer comprising polyamide blocks with carboxylic ends and polyether diol, wherein said thermoplastic film is permeable to water vapour, to ethylene, to $CO_2$, and to oxygen, wherein the permeability to $CO_2$ is greater than the permeability to oxygen and wherein the thermoplastic film comprises polyolefins.

9. The packaging of claim 8 wherein the permeability to $CO_2$ is at least 5.4 times the permeability to oxygen.

10. The packaging of claim 1 wherein the packaging is wrapped about the fruit before harvest.

11. A film comprising
a polymer containing polyamide blocks and PEG blocks;
a polymer selected from the group consisting of a polyethylene and a copolymer of ethylene with an alpha-olefin; and
a copolymer of ethylene with at least one member of the group consisting of (meth)acrylate, maleic anhydride, maleic acid, and acrylic acid, wherein the film is permeable to water vapor, to ethylene, to carbon dioxide and to oxygen such that the permeability to carbon dioxide is greater than to oxygen.

* * * * *